(12) United States Patent
Akatsuka

(10) Patent No.: US 12,475,920 B2
(45) Date of Patent: Nov. 18, 2025

(54) DISK DEVICE WITH FLEXIBLE SUBSTRATE HOLDING PROTRUSION CONFIGURATION

(71) Applicants: Kabushiki Kaisha Toshiba, Tokyo (JP); Toshiba Electronic Devices & Storage Corporation, Tokyo (JP)

(72) Inventor: Naoto Akatsuka, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/749,497

(22) Filed: Jun. 20, 2024

(65) Prior Publication Data

US 2024/0339126 A1 Oct. 10, 2024

Related U.S. Application Data

(62) Division of application No. 18/179,279, filed on Mar. 6, 2023, now abandoned.

(30) Foreign Application Priority Data

Sep. 16, 2022 (JP) .................................. 2022-147874

(51) Int. Cl.
 *G11B 5/48* (2006.01)
(52) U.S. Cl.
 CPC ............ *G11B 5/486* (2013.01); *G11B 5/4833* (2013.01)

(58) Field of Classification Search
 None
 See application file for complete search history.

(56) References Cited

U.S. PATENT DOCUMENTS

| | | |
|---|---|---|
| 5,027,242 A | 6/1991 | Nishida et al. |
| 5,382,851 A | 1/1995 | Loubier |
| 5,644,448 A | 7/1997 | Suzuki |
| 5,692,289 A | 12/1997 | Amada et al. |
| 5,862,011 A | 1/1999 | Sega et al. |

(Continued)

FOREIGN PATENT DOCUMENTS

| | | |
|---|---|---|
| JP | H08-507197 A | 7/1996 |
| JP | H09-320213 A | 12/1997 |

(Continued)

*Primary Examiner* — Craig A. Renner
(74) *Attorney, Agent, or Firm* — Kim & Stewart LLP

(57) ABSTRACT

A disk device includes magnetic disks, a magnetic head, a suspension, and a carriage. The suspension includes a flexible substrate on which the magnetic head is mounted. The carriage includes an arm to which the suspension is attached. The arm includes opposing first and second end surfaces, a side surface extending between the first end surface and the second end surface, and a protruding body that protrudes from the side surface and has a first surface parallel to and spaced apart from the first end surface and a second surface parallel to and spaced apart from the second end surface. The flexible substrate includes a strip extending along the side surface. The strip includes a portion positioned between the first end surface and the protruding body in the axial direction and is positioned between the first end surface and the second end surface in the axial direction.

16 Claims, 7 Drawing Sheets

(56) References Cited

U.S. PATENT DOCUMENTS

| | | | |
|---|---|---|---|
| 6,397,699 | B1 | 6/2002 | Ikemoto et al. |
| 9,620,156 | B2 * | 4/2017 | Igarashi et al. ...... G11B 5/4833 |
| 2005/0011065 | A1 | 1/2005 | Zhang et al. |
| 2005/0152071 | A1 | 7/2005 | Hayakawa et al. |
| 2006/0114614 | A1 | 6/2006 | Tsujino et al. |
| 2007/0146935 | A1 | 6/2007 | Minami et al. |
| 2007/0242390 | A1 | 10/2007 | Okada et al. |
| 2008/0019054 | A1 | 1/2008 | Hur |
| 2009/0290262 | A1 | 11/2009 | Suzuki |

FOREIGN PATENT DOCUMENTS

| | | |
|---|---|---|
| JP | 2001-135043 A | 5/2001 |
| JP | 2004-039069 A | 2/2004 |

* cited by examiner

DISK DEVICE WITH FLEXIBLE SUBSTRATE HOLDING PROTRUSION CONFIGURATION

CROSS-REFERENCE TO RELATED APPLICATIONS

This application is a divisional of U.S. patent application Ser. No. 18/179,279, filed Mar. 6, 2023, which is based upon and claims the benefit of priority from Japanese Patent Application No. 2022-147874, filed Sep. 16, 2022, the entire contents of which are incorporated herein by reference.

FIELD

Embodiments described herein relate generally to a disk device.

BACKGROUND

A disk device such as a hard disk drive (HDD) includes a magnetic disk, a magnetic head, and a head stack assembly (HSA), for example. The HSA includes a rotating carriage and a head gimbal assembly (HGA) to which the magnetic head is attached.

The HGA is attached to an arm of the carriage. The HGA also includes a flexible substrate (flexure) on which the magnetic head is mounted. Various electrical signals input into or output from the magnetic head flow through wiring of the flexure.

A portion of the flexure is held on an arm, for example. Forming a portion to hold the flexure on the arm poses difficulty in designing a thin arm.

DETAILED DESCRIPTION

Embodiments provide a disk device that allows thinning of the arm.

In general, according to one embodiment, a disk device includes a plurality of magnetic disks, a first magnetic head, a first suspension, and a carriage. Each of the plurality of magnetic disks includes a recording surface. The first magnetic head is configured to read and write information from and to one of the plurality of magnetic disks. The first suspension includes a first flexible substrate on which the first magnetic head is mounted. The carriage includes an arm to which the first suspension is attached, and is configured to rotate around a rotation axis to move the first magnetic head relative to the plurality of magnetic disks. The arm includes a first end surface configured to face one of the plurality of magnetic disks when the first magnetic head is placed over the recording surface thereof, a second end surface opposite to the first end surface, a side surface extending between the first end surface and the second end surface, and a protruding body that protrudes from the side surface, the protruding body having a first surface parallel to and spaced apart from the first end surface and a second surface parallel to and spaced apart from the second end surface. The first flexible substrate includes a first strip extending along the side surface. The first strip includes a first portion positioned between the first end surface and the protruding body in the axial direction and is positioned between the first end surface and the second end surface in the axial direction.

First Embodiment

Hereinafter, a first embodiment will be described with reference to FIGS. 1 to 5. It is to be noted that, in the present specification, plural expressions may be used for components and description thereof according to the embodiments. The components and the descriptions thereof are illustrative and are not limited by the expressions herein. Components may also be identified by names other than the names used herein. In addition, components may be described with terms other than the terms used herein.

Figure 1:
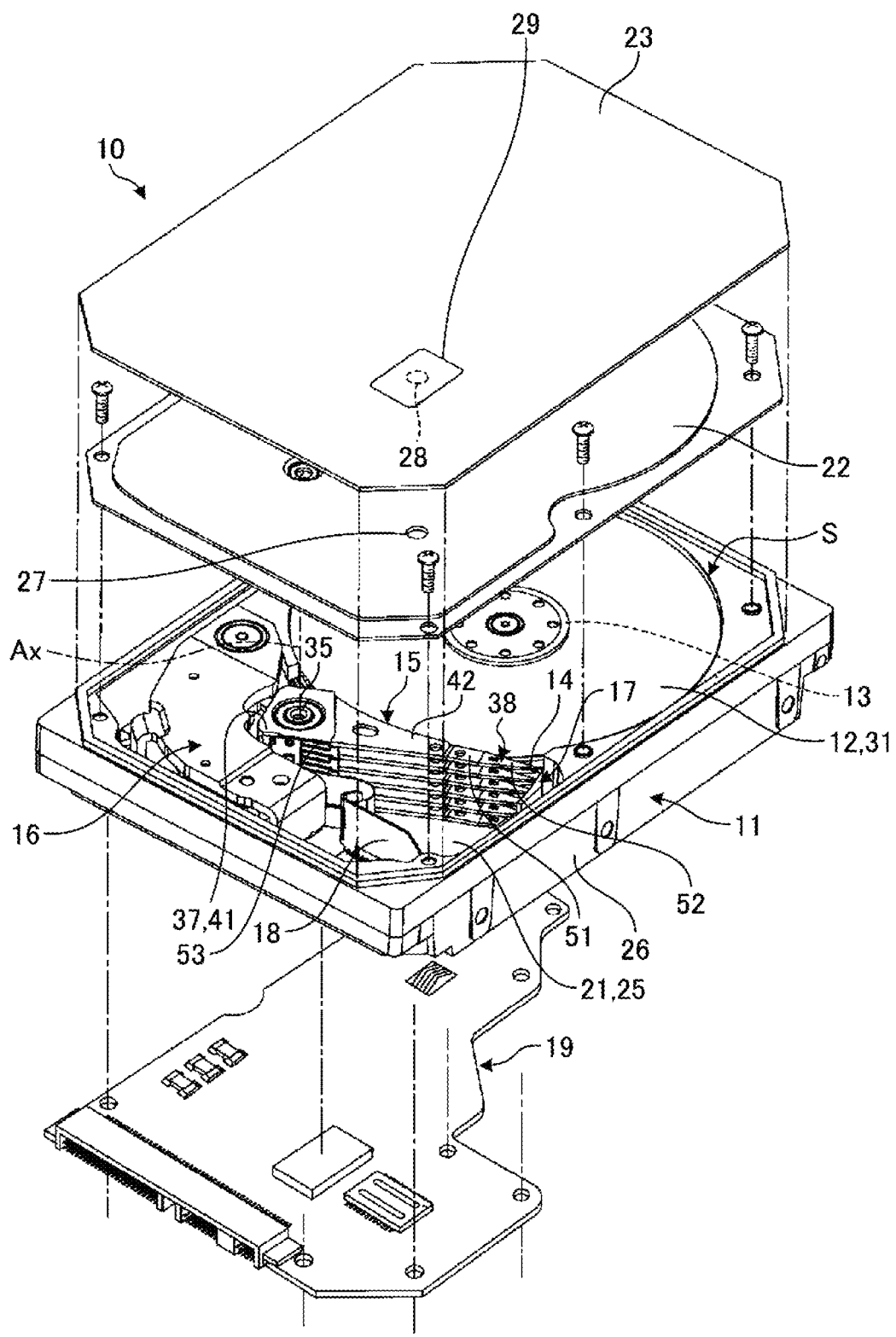
FIG. 1 is an exploded perspective view of an HDD according to a first embodiment.

FIG. 1 is an exploded perspective view illustrating a hard disk drive (HDD) 10 according to the first embodiment. The HDD 10 is an example of a disk device and may also be called an electronic device, a storage device, an external storage device, or a magnetic disk device. The HDD 10 is a near-online (also referred to as "nearline") HDD, for example. It is to be noted that the HDD 10 is not limited to this example.

As illustrated in FIG. 1, the HDD 10 includes a housing 11, a plurality of magnetic disks 12, a spindle motor 13, a plurality of magnetic heads 14, a head stack assembly (HSA) 15, a voice coil motor (VCM) 16, a ramp load mechanism 17, a flexible printed circuit board (FPC) 18, and a printed circuit board (PCB) 19. The housing 11 may also be referred to as a base. The magnetic head 14 and the FPC 18 may be provided in the HSA 15.

Figure 2:
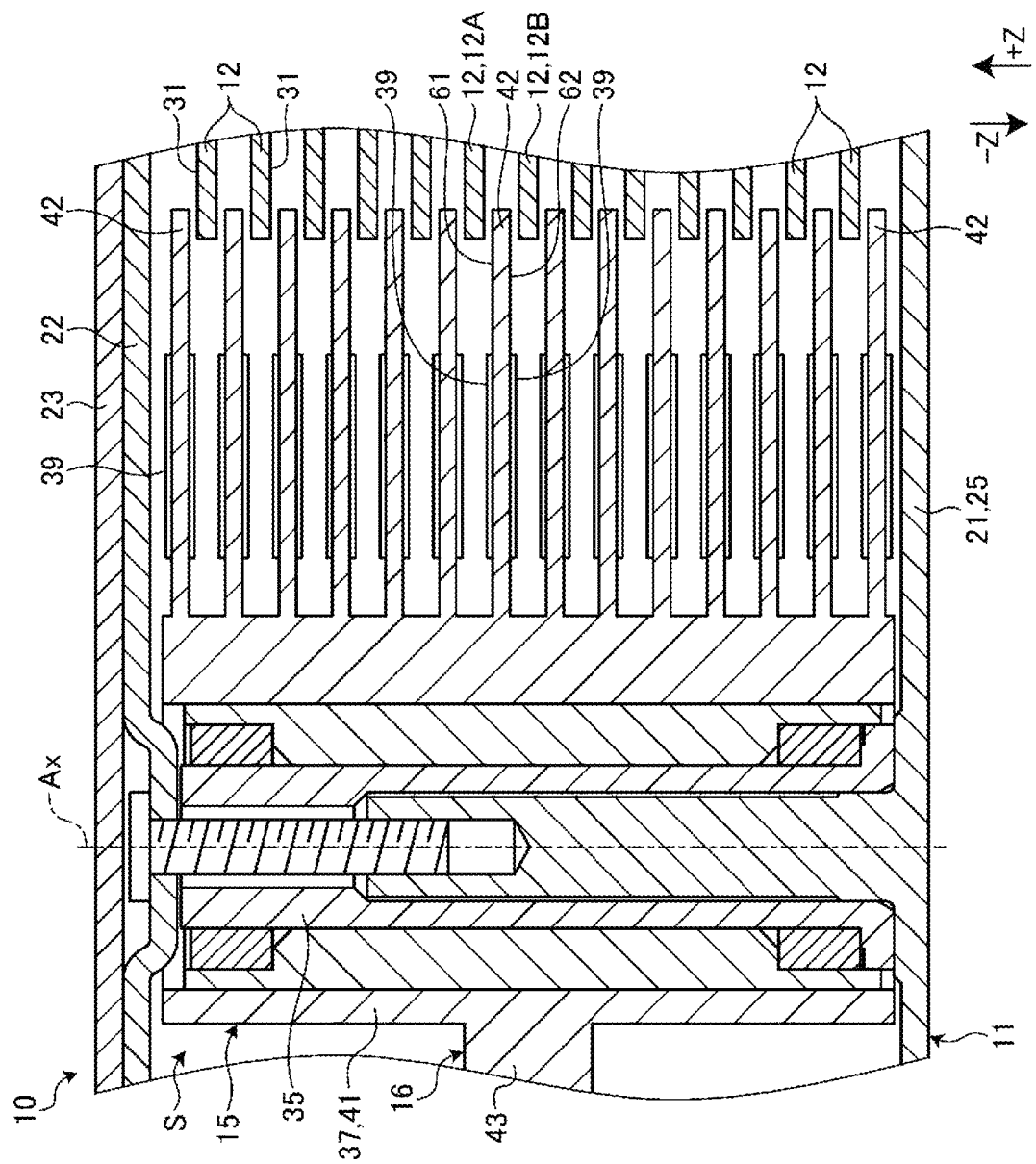
FIG. 2 is a cross-sectional view illustrating a part of the HDD of the first embodiment.

FIG. 2 is a cross-sectional view illustrating a part of the HDD 10 of the first embodiment. As illustrated in FIG. 2, the +Z direction and the −Z direction are defined for convenience herein. The +Z direction is a direction along the thickness of the HDD 10. The −Z direction is the direction opposite to the +Z direction.

The housing 11 includes a base 21, an inner cover 22, and an outer cover 23. It is to be noted that the housing 11 is not limited to this example. The base 21, the inner cover 22, and the outer cover 23 are made of a metal material such as an aluminum alloy, respectively. It is to be noted that the materials of the base 21, the inner cover 22, and the outer cover 23 may be different from each other.

As illustrated in FIG. 1, the base 21 is formed in a shape of a substantially rectangular parallelepiped box with an inner chamber S provided in the base 21. The inner chamber S is open to the outside of the base 21 in the +Z direction. The housing 11 accommodates the plurality of magnetic disks 12, the spindle motor 13, the plurality of magnetic heads 14, the HSA 15, the VCM 16, the ramp load mechanism 17, and the FPC 18 in the inner chamber S.

The base 21 includes a bottom wall 25 and a side wall 26. The bottom wall 25 is formed in a shape of a substantially rectangular (quadrangular) plate extending substantially perpendicular to the +Z direction. The side wall 26 protrudes substantially in the +Z direction from the edge of the bottom wall 25 and is formed in a shape of a substantially rectangular frame. The bottom wall 25 and the side wall 26 are integrally formed.

The inner cover 22 is attached to the end of the side wall 26 with screws, for example, in the +Z direction to close up the inner chamber S. The outer cover 23 covers the inner cover 22 and is attached to the end of the side wall 26 by welding in the +Z direction, for example.

A vent 27 is provided in the inner cover 22. Furthermore, the outer cover 23 is provided with a vent 28. After the components are attached to the inside of the base 21 and the inner cover 22 and the outer cover 23 are attached to the base 21, the air in the housing 11 is removed through the vents 27 and 28. Furthermore, the inside of the housing 11 is filled with a gas other than air.

The gas filled in the housing 11 is a low-density gas having a density lower than the density of air, an inert gas having low reactivity, or the like, for example. For example, helium is filled in the housing 11. It is to be noted that the inside of the housing 11 may be filled with other fluids. Further, the inside of the housing 11 may be kept in a vacuum, at a low pressure close to a vacuum, or at a negative pressure lower than the atmospheric pressure.

The vent 28 of the outer cover 23 is closed by a seal 29. The seal 29 hermetically seals the vent 28 and prevents the fluid filled in the housing 11 from leaking through the vent 28.

The plurality of magnetic disks 12 are formed in a disc shape extending perpendicular to the +Z direction. The diameter of the magnetic disk 12 is approximately 3.5 inches, for example. As illustrated in FIG. 2, the HDD 10 of the present embodiment includes 13 magnetic disks 12, for example. The number of magnetic disks 12 may be 11 or more. It is to be noted that the diameter and number of magnetic disks 12 are not limited to this example.

Each of the plurality of magnetic disks 12 includes at least one recording surface 31, for example. The recording surface 31 is provided on at least one of the upper and lower surfaces of the magnetic disk 12. In other words, each of the plurality of recording surfaces 31 is a surface of the magnetic disk 12 oriented substantially in the +Z direction or a surface of the magnetic disk 12 oriented substantially in the −Z direction. The recording surface 31 is a substantially flat surface perpendicular to the +Z direction. A magnetic recording layer of the magnetic disk 12 is provided on the recording surface 31.

The spindle motor 13 in FIG. 1 supports and rotates the plurality of magnetic disks 12 stacked with a gap in the +Z direction or the −Z direction. The plurality of magnetic disks 12 are held on the hub of the spindle motor 13 by clamp springs, for example.

Each of the plurality of magnetic heads 14 records and reproduces information to and from a corresponding surface of the recording surfaces 31 of the plurality magnetic disks 12. In other words, each of the plurality of magnetic heads 14 reads and writes information from and to one of the plurality of magnetic disks 12.

The HSA 15 is rotatably supported by a support shaft 35 disposed at a location spaced apart from the magnetic disk 12. The support shaft 35 extends substantially in the +Z direction from the bottom wall 25 of the housing 11, for example.

The HSA 15 may be rotated around a central axis Ax. The central axis Ax is an example of a rotation axis and is a vertical axis extending in the +Z direction and the −Z direction. The central axis Ax is the center of rotation of the HSA 15 and also the central axis of the support shaft 35, for example.

Hereinafter, axial, radial and circumferential directions are defined for convenience. The axial direction is the direction along the central axis Ax. In the present embodiment, the central axis Ax extends in the +Z direction and the −Z direction. Therefore, the axial direction includes the +Z direction and the −Z direction. The radial direction is a direction perpendicular to the central axis Ax and includes a plurality of directions perpendicular to the central axis Ax. The circumferential direction is the direction of rotation about the central axis Ax and includes the direction of clockwise rotation and the direction of counterclockwise rotation about the central axis Ax.

The VCM 16 rotates the HSA 15 around the central axis Ax to locate the HSA 15 at a desired location. When the VCM 16 rotates the HSA 15 to move the magnetic head 14 to the outermost circumference of the magnetic disk 12, the ramp load mechanism 17 holds the magnetic head 14 at a location spaced apart from the magnetic disk 12.

Figure 3:
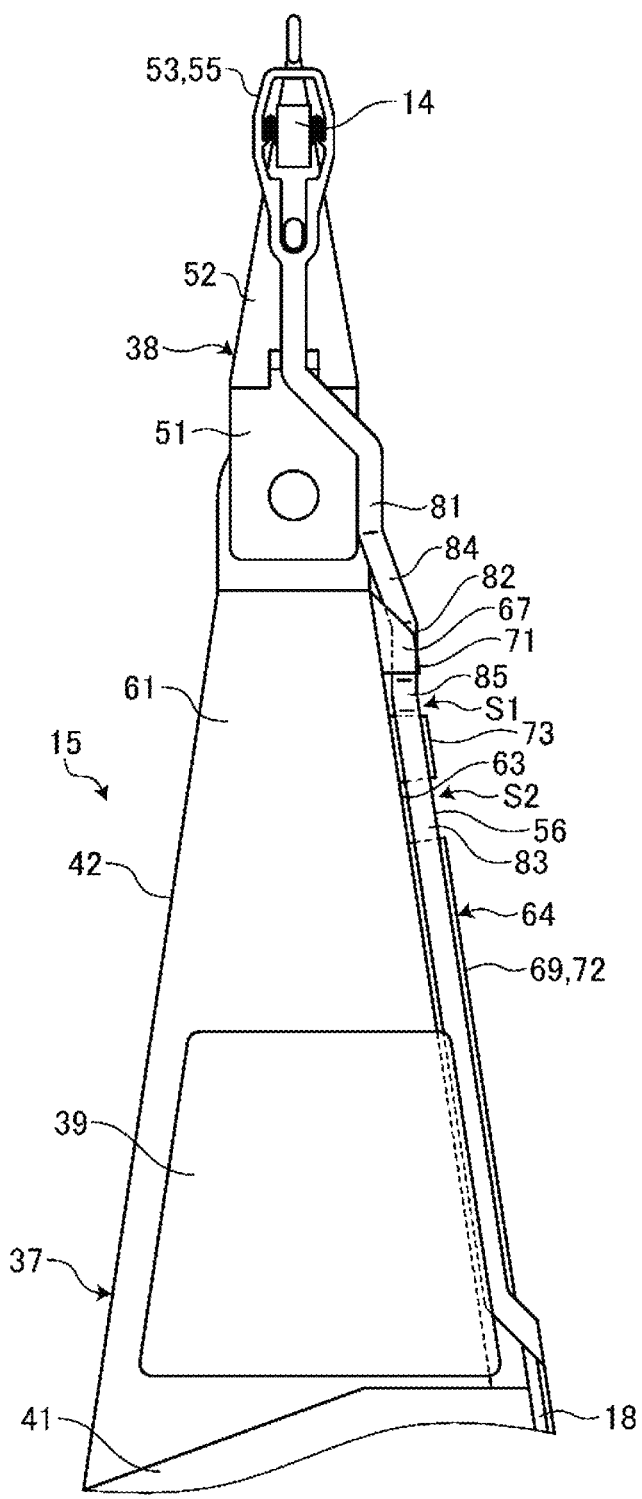
FIG. 3 is a plan view illustrating a HGA and an arm of the first embodiment.

FIG. 3 is a plan view illustrating HGAs 38 and arms 42 of the first embodiment. As illustrated in FIG. 3, the HSA 15 includes a carriage 37, a plurality of head gimbal assemblies (HGA) 38, and a plurality of arm dampers 39. In some embodiments, the arm damper 39 may be an example of a holder and the arm damper 39 may also be an example of a limiting wall. As illustrated in FIG. 2, the carriage 37 includes an actuator block 41, a plurality of arms 42, and a coil holder 43.

The actuator block 41 is rotatably supported by the support shaft 35 via bearings, for example. The plurality of arms 42 protrude radially outward from the actuator block 41. The HSA 15 may be divided such that the arms 42 may protrude from each of the plurality of actuator blocks 41.

The plurality of arms 42 are located at intervals in the axial direction. Each arm 42 is formed in a plate shape that may enter the gap between adjacent magnetic disks 12. The plurality of arms 42 extend substantially parallel to one another.

In the present embodiment, the carriage 37 includes 14 arms 42. The number of arms 42 is one more than the number of magnetic disks 12. It is to be noted that the number of arms 42 is not limited to this example.

The coil holder 43 protrudes from the actuator block 41 in a direction opposite to the direction in which the arms 42 protrude. The coil holder 43 holds the voice coil of the VCM 16. The VCM 16 includes the voice coil, a pair of yokes, and magnets provided on the yokes.

The actuator block 41, the plurality of arms 42, and the coil holder 43 are integrally formed of aluminum, for example. It is to be noted that the materials of the actuator block 41, the arms 42, and the coil holder 43 are not limited to this example.

As illustrated in FIG. 3, the plurality of HGAs 38 are attached to tip portions of the corresponding arms of the plurality of arms 42 and protrude from the arms 42. The plurality of HGAs 38 are thereby located at intervals in the Z direction. Each HGA 38 includes a base plate 51, a load beam 52, and a flexure 53.

The base plate 51 and load beam 52 are made of stainless steel, for example. It is to be noted that materials for the base plate 51 and the load beam 52 are not limited to this example. The base plate 51 is formed in a plate shape and attached to the tip portion of the arm 42 by fastening, for example.

The load beam 52 is attached to the tip portion of the base plate 51 and protrudes from the base plate 51 in a direction perpendicular to the central axis Ax. The load beam 52 is thinner than the base plate 51 and formed in a plate shape substantially perpendicular to the axial direction.

The flexure 53 is formed in a shape of an elongated belt. The flexure 53 is a flexible substrate including a metal plate (backing layer) such as stainless steel, an insulating layer formed on the metal plate, a conductive layer formed on the insulating layer to form a plurality of wirings (wiring patterns), and a protective layer (insulating layer) covering the conductive layer, for example. It is to be noted that the flexure 53 is not limited to this example.

The flexure 53 includes a gimbal portion 55 (elastic support portion) and a tail portion 56. Each of the gimbal portion 55 and the tail portion 56 is a part of the flexure 53 and includes at least one of a metal plate, an insulating layer, a conductive layer, and a protective layer.

The gimbal portion 55 is provided at one end of the flexure 53 and is positioned on the load beam 52. The magnetic head 14 is mounted on the gimbal portion 55. The flexure 53 is thereby electrically connected to the magnetic head 14.

The gimbal portion 55 includes, for example, a frame-like portion attached to the load beam 52 and a portion on which the magnetic head 14 is mounted and which is elastically displaceable with respect to the frame-like portion. It is to be noted that the gimbal portion 55 is not limited to this example.

The tail portion 56 extends from the gimbal portion 55 on the load beam 52 toward the actuator block 41 along the arm 42. It is to be noted that another portion may be provided between the gimbal portion 55 and the tail portion 56. The end of the tail portion 56 is connected to one end of the FPC 18 attached to the actuator block 41. The other end of the FPC 18 is connected to a connector provided on the bottom wall 25, for example.

The PCB 19 in FIG. 1 is a rigid board such as a glass epoxy substrate, a multilayer substrate, a build-up substrate, or the like, for example. The PCB 19 is disposed outside the housing 11 and is attached to the bottom wall 25.

Various electronic components such as a relay connector connected to the FPC 18, an interface (I/F) connector connected to the host computer, and a controller for controlling the operation of the HDD 10 are mounted on the PCB 19, for example. The relay connector is electrically connected to the FPC 18 via a connector provided on the bottom wall 25.

For example, the controller of the PCB 19 drives the VCM 16 to rotate the HSA 15 around the central axis Ax. The magnetic head 14 mounted on the HGA 38 of the HSA 15 is thereby moved with respect to the magnetic disk 12. In other words, the carriage 37 of the HSA 15 is rotated around the central axis Ax to move the magnetic head 14 with respect to the plurality of magnetic disks 12.

As illustrated in FIG. 2, the arm damper 39 is attached to the arm 42. The arm damper 39 includes a restraining plate made of stainless steel, aluminum, or synthetic resin and a viscoelastic material layer for attaching the restraining plate to the arm 42, for example. Vibration of the arm 42 is alleviated by the displacement of the restraining plate.

Figure 4:
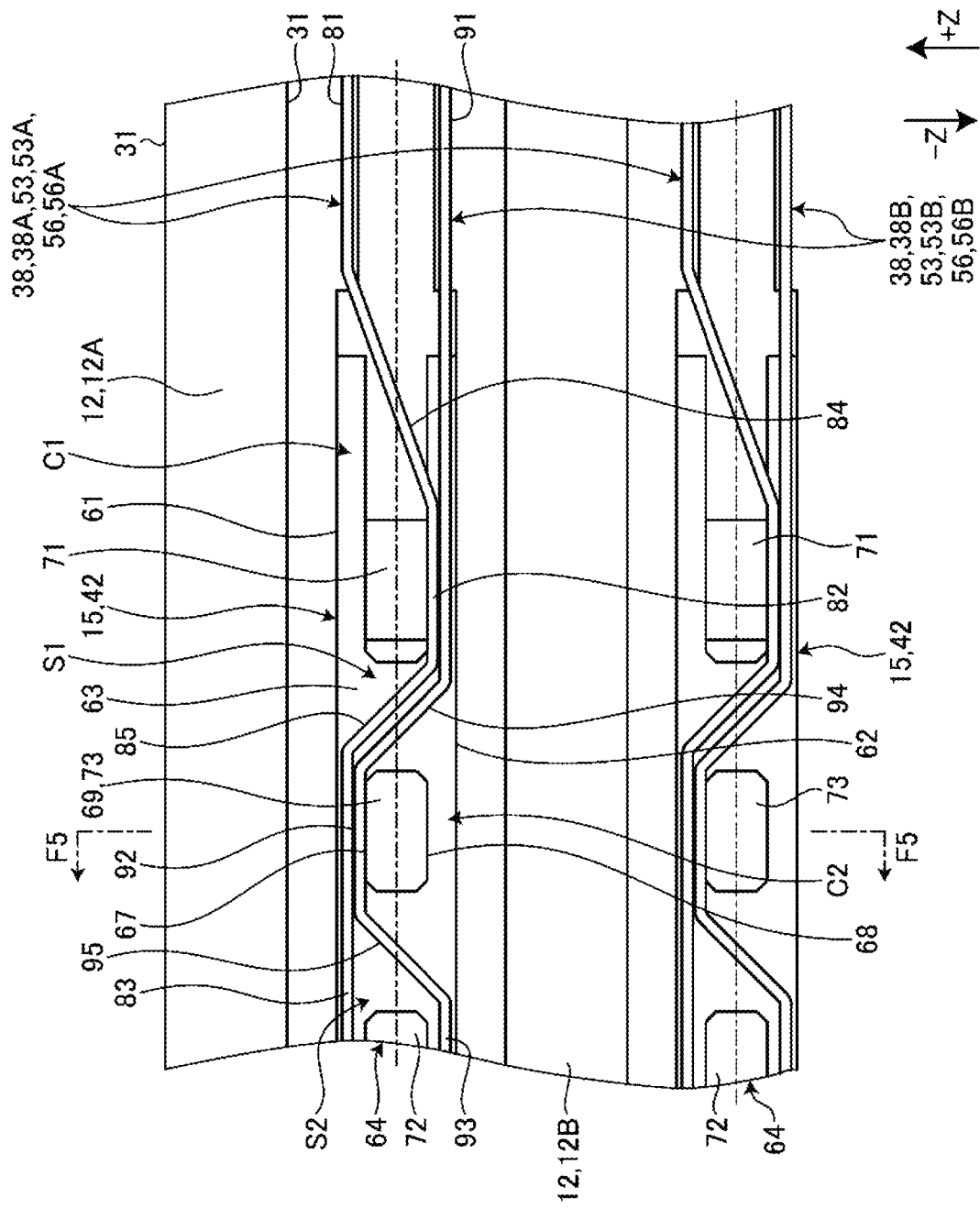
FIG. 4 is a side view illustrating some of a plurality of magnetic disks and some of a plurality of HSAs of the first embodiment.

FIG. 4 is a side view illustrating some of the plurality of magnetic disks 12 and some of a plurality of HSAs 15 of the first embodiment. Two of the plurality of magnetic disks 12, which are illustrated in FIG. 4, may be individually referred to as magnetic disks 12A and 12B in the following description. In addition, two of the plurality of HGAs 38, which are illustrated in FIG. 4, may be individually referred to as HGAs 38A and 38B.

The magnetic disk 12A is one example of a magnetic disk that is one of the plurality of magnetic disks. The magnetic disk 12B is another example of a magnetic disk that is one of the plurality of magnetic disks. HGA 38A is an example of a first suspension. HGA 38B is an example of a second suspension.

The two magnetic disks 12A and 12B are adjacent to each other in the axial direction. The magnetic disk 12B is spaced apart from the magnetic disk 12A in the −Z direction. One arm 42 positioned between the two magnetic disks 12A and 12B in the axial direction and the HGAs 38A and 38B attached to the arm 42 will be described in detail below. The plurality of arms 42 have substantially the same shape.

The flexure 53 provided in the HGA 38A is referred to as a flexure 53A. The flexure 53A is an example of a first substrate. Furthermore, the tail portion 56 of the flexure 53A is referred to as a tail portion 56A. The tail portion 56A is an example of a first strip.

One of the plurality of magnetic heads 14 mounted on the flexure 53A is an example of a first magnetic head. The magnetic head 14 mounted on the flexure 53A reads and writes information from and to the magnetic disk 12A.

The flexure 53 provided in the HGA 38B is referred to as a flexure 53B. The flexure 53B is an example of a second substrate. Furthermore, the tail portion 56 of the flexure 53B is referred to as a tail portion 56B. The tail portion 56B is an example of a second strip.

One of the plurality of magnetic heads 14 mounted on the flexure 53B is an example of a second magnetic head. The magnetic head 14 mounted on the flexure 53B reads and writes information from and to the magnetic disk 12B.

The arm 42 includes a first end surface 61, a second end surface 62, side surfaces 63 and protrusions 64. The first end surface 61 is formed substantially flat and is oriented substantially in the +Z direction. The second end surface 62 is positioned opposite to the first end surface 61. The second end surface 62 is formed substantially flat and is oriented substantially in the −Z direction.

As the arm 42 enters the gap between the two magnetic disks 12A and 12B, the magnetic head 14 mounted on the flexure 53A is placed over the recording surface 31 of the magnetic disk 12A. Furthermore, the magnetic head 14 mounted on the flexure 53B is placed over the recording surface 31 of the magnetic disk 12B.

When the magnetic head 14 is placed over the recording surface 31, the first end surface 61 faces the recording surface 31 of the magnetic disk 12A with a gap therebetween. Furthermore, the second end surface 62 faces the recording surface 31 of the magnetic disk 12B with a gap therebetween.

Figure 5:
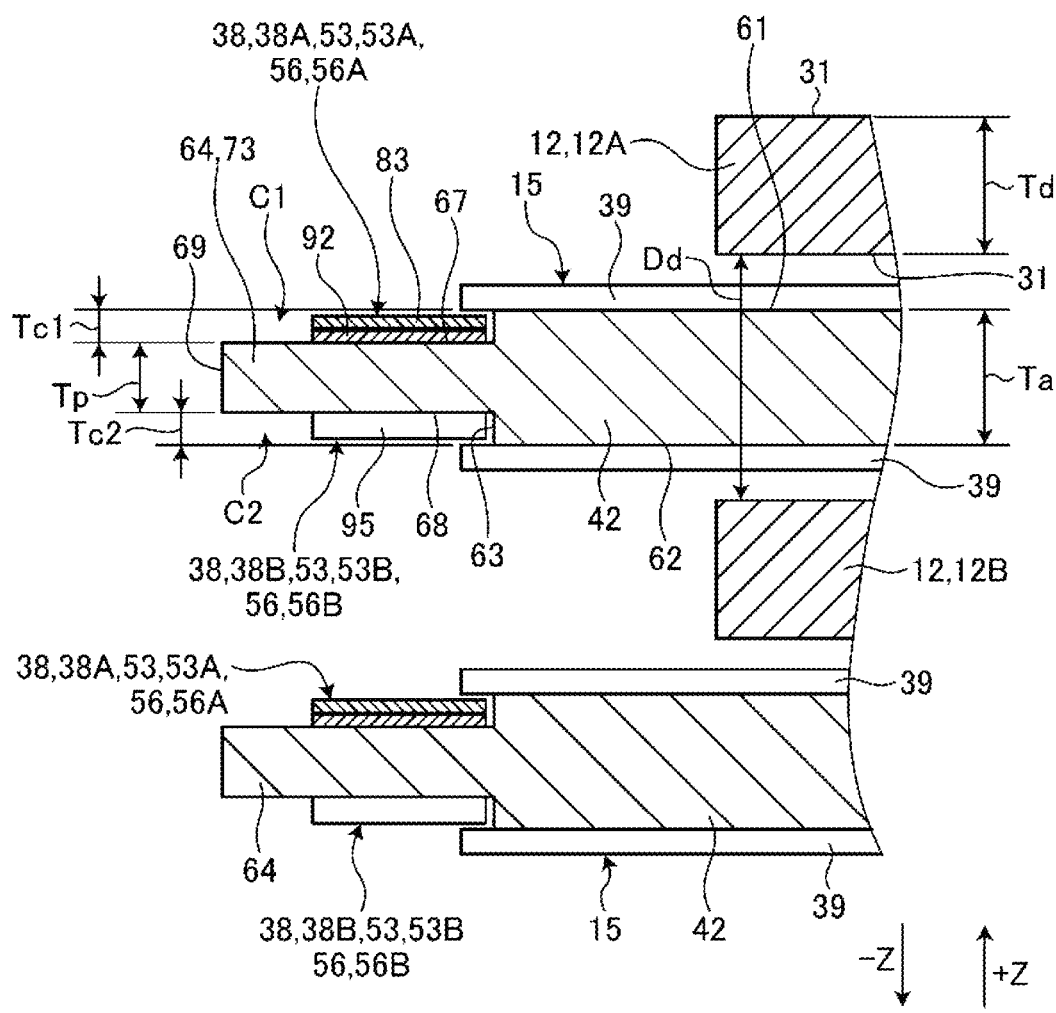
FIG. 5 is a cross-sectional view illustrating some of the plurality of magnetic disks and some of the plurality of HSAs of the first embodiment taken along line F5-F5 of FIG. 4.

FIG. 5 is a cross-sectional view illustrating some of the plurality of magnetic disks 12 and some of the plurality of HSAs 15 of the first embodiment taken along line F5-F5 of FIG. 4. As illustrated in FIG. 5, a side surface 63 extends between the edge of first end surface 61 and the edge of second end surface 62. The side surface 63 is formed substantially flat and is oriented in a direction substantially perpendicular to the axial direction.

The protrusion 64 protrudes from the side surface 63. The protrusion 64 is spaced apart from the first end surface 61 in the −Z direction and spaced apart from the second end surface 62 in the +Z direction in the axial direction. That is, the protrusion 64 is a portion of the arm 42 that is thinner than the portion including the first end surface 61 and the second end surface 62. The protrusion 64 includes a first guide surface 67, a second guide surface 68, and a side end surface 69.

The first guide surface 67 is formed substantially flat and is oriented substantially in the +Z direction. The first guide surface 67 is spaced apart from the first end surface 61 in the −Z direction in the axial direction. The second guide surface 68 is positioned opposite to the first guide surface 67. The second guide surface 68 is formed substantially flat and is oriented substantially in the −Z direction. The second guide surface 68 is spaced apart from the second end surface 62 in the +Z direction in the axial direction.

The first end surface 61, the second end surface 62, the first guide surface 67, and the second guide surface 68 are formed substantially parallel to each other. It is to be noted that the first end surface 61, the second end surface 62, the first guide surface 67, and the second guide surface 68 are not limited to this example.

The side end surface 69 extends between the edge of the first guide surface 67 and the edge of the second guide surface 68. The side end surface 69 is formed substantially flat and is oriented in a direction substantially perpendicular to the axial direction. The direction in which the side end surface 69 is oriented may be substantially the same as or may be different from the direction in which the side surface 63 is oriented.

As illustrated in FIG. 4, in the present embodiment, the center of the protrusion 64 is located at the center between the first end surface 61 and the second end surface 62 in the axial direction. The center of the protrusion 64 in the axial direction is the center between the first guide surface 67 and the second guide surface 68 in the axial direction.

By providing the protrusion 64, a first notch C1 and a second notch C2 are formed in the arm 42. As illustrated in FIG. 5, the first notch C1 is a space formed (defined or partitioned) by the side surface 63 and the first guide surface 67. The first notch C1 is open to the outside of the arm 42 in the +Z direction. The second notch C2 is a space formed by the side surface 63 and the second guide surface 68. The second notch C2 is open to the outside of the arm 42 in the −Z direction. At least one of the first notch C1 and the second notch C2 may be closed by a component other than the arm 42.

As illustrated in FIG. 4, the protrusion 64 of the present embodiment includes a plurality of holding protrusions 71, 72, and 73. The holding protrusion 71 is an example of a first holding protrusion. The holding protrusion 72 is an example of a second holding protrusion. The holding protrusion 73 is an example of a third holding protrusion.

Each of the plurality of holding protrusions 71, 72, and 73 protrudes from the side surface 63. The plurality of holding protrusions 71, 72, and 73 are located substantially linearly in the direction in which the arm 42 extends through the gap. As illustrated in FIG. 3, the holding protrusion 71 is closer to the base plate 51, the load beam 52, the gimbal portion 55, and the magnetic head 14 than the holding protrusions 72 and 73 are. The holding protrusion 72 is closer to the actuator block 41 than the holding protrusions 71 and 73 are. The holding protrusion 73 is positioned between the holding protrusion 71 and the holding protrusion 72.

A first slit S1 is provided between the holding protrusion 71 and the holding protrusion 73. The first slit S1 is an example of a first gap. A second slit S2 is provided between the holding protrusion 72 and the holding protrusion 73. The second slit S2 is an example of a second gap.

The protrusion 64 is divided into three holding protrusions 71, 72, and 73 by the first slit S1 and the second slit S2. Therefore, each of the three holding protrusions 71, 72, and 73 includes a part of the first guide surface 67 and a part of the second guide surface 68. The first guide surfaces 67 of the three holding protrusions 71, 72, and 73 are provided substantially on the same plane. In addition, the second guide surfaces 68 of the three holding protrusions 71, 72, and 73 are provided substantially on the same plane.

In other words, each of the first slit S1 and the second slit S2 penetrates the protrusion 64 in a direction (for example, axial direction) that intersects the longitudinal direction of the arm 42. Each of the first slit S1 and the second slit S2 is open to the first guide surface 67, the second guide surface 68, and the side end surface 69 and in fluid communication with the first notch C1 and the second notch C2.

As illustrated in FIG. 5, in the present embodiment, the thickness Ta of the arm 42 is less than the thickness Td of each of the plurality of magnetic disks 12. The thickness Ta of the arm 42 is a distance between the first end surface 61 and the second end surface 62 in the axial direction.

For example, the thickness Ta of the arm 42 is set to approximately 0.470 mm. The thickness Ta may be set to 0.400 mm to 0.650 mm. Meanwhile, the thickness Td of each of the plurality of magnetic disks 12 is 0.500 mm or more and is set to approximately 0.635 mm, for example. It is to be noted that the thicknesses Ta and Td are not limited to this example.

The depth Tc1 of the first notch C1 and the depth Tc2 of the second notch C2 are less than thickness Tp of the protrusion 64, respectively. The depth Tc1 is a distance between the first end surface 61 and the first guide surface 67 of the protrusion 64 in the axial direction. The depth Tc2 is a distance between the second end surface 62 and the second guide surface 68 of the protrusion 64 in the axial direction. The thickness Tp is a distance between the first guide surface 67 and the second guide surface 68 in the axial direction.

For example, the depth Tc1 of the first notch C1 and the depth Tc2 of the second notch C2 are set to approximately 0.110 mm, respectively. The thickness Tp of the protrusion 64 is set to approximately 0.250 mm. It is to be noted that the depths Tc1 and Tc2 and the thickness Tp are not limited to this example.

The thickness of the tail portions 56A and 56B is respectively less than the depth Tc1 of the first notch C1 and less than the depth Tc2 of the second notch C2. The thickness of the tail portions 56A and 56B is 0.040 mm respectively, for example.

The thickness Ta of the arm 42 is less than the distance Dd between the plurality of magnetic disks 12 in the axial direction. The distance Dd is 1.100 mm to 1.200 mm, and is set to 1.132 mm, for example. It is to be noted that the distance Dd is not limited to this example.

As illustrated in FIG. 4, the tail portions 56A and 56B extend along the side surface 63 of the arm 42. In other words, the side surface 63 faces the tail portions 56A and 56B. Furthermore, the tail portions 56A and 56B are positioned between the first end surface 61 and the second end surface 62 in the axial direction. A portion of the tail portions 56A and 56B may temporarily protrude beyond the range between the first end surface 61 and the second end surface 62 in the axial direction.

In the present embodiment, each of the tail portions 56A and 56B is bent or curved to pass through the first slit S1 and the second slit S2. In other words, the tail portions 56A and 56B pass through the first slit S1 and the second slit S2 and are hooked on the holding protrusions 71, 72, and 73.

The tail portion 56A includes three parallel portions 81, 82, and 83 and two inclined portions 84 and 85. The parallel portion 82 is an example of a second portion. The parallel portion 83 is an example of a first portion. The inclined portion 85 is an example of a third portion.

Each of the parallel portions 81, 82, and 83 is a portion of the tail portion 56A extending approximately parallel to the first end surface 61, the second end surface 62, the first guide surface 67 and the second guide surface 68. It is to be noted that the parallel portions 81, 82, and 83 may be inclined with respect to the first end surface 61, the second end surface 62, the first guide surface 67, and the second guide surface 68.

Each of the inclined portions 84 and 85 is a portion of the tail portion 56A extending obliquely with respect to the first end surface 61, the second end surface 62, the first guide surface 67, and the second guide surface 68. In the example of FIG. 4, the parallel portions 81, 82, and 83 and the inclined portions 84 and 85 extend linearly. However, the parallel portions 81, 82, and 83 and the inclined portions 84 and 85 may extend with curves.

The parallel portion 81 is positioned outside the first notch C1 and the second notch C2 and is connected to the gimbal portion 55, for example. The parallel portion 81 is positioned near the first end surface 61 in the axial direction. For example, the parallel portion 81 is positioned between the protrusion 64 and the first end surface 61 in the axial direction. It is to be noted that the parallel portion 81 is not limited to this example.

The parallel portion 82 is disposed in the second notch C2. The parallel portion 82 is positioned between the second end surface 62 and the holding protrusion 71 of the protrusion 64 in the axial direction. The side surface 63 and the second guide surface 68 of the holding protrusion 71 face the parallel portion 82. The parallel portion 82 extends along the second guide surface 68 of the holding protrusion 71.

The parallel portion 83 is disposed in the first notch C1. The parallel portion 83 is positioned between the first end surface 61 and the holding protrusions 72 and 73 of the protrusion 64 in the axial direction. The side surface 63 and the first guide surfaces 67 of the holding protrusions 72 and 73 face the parallel portion 83. The parallel portion 83 extends along the first guide surface 67 of the holding protrusions 72 and 73.

The inclined portion 84 extends between one end of the parallel portion 81 and one end of the parallel portion 82. The inclined portion 85 extends between the other end of the parallel portion 82 and one end of the parallel portion 83 through the first slit S1. As described above, the tail portion 56A is bent or curved with respect to the parallel portions 81 and 83 extending along the first end surface 61 such that the parallel portion 82 and the inclined portions 84 and 85 are hooked on the holding protrusion 71.

The tail portion 56B includes three parallel portions 91, 92, and 93 and two inclined portions 94 and 95. The parallel portion 91 is an example of a fourth portion. The parallel portion 92 is an example of a fifth portion. The parallel portion 93 is an example of a seventh portion. The inclined portion 94 is an example of a sixth portion. The inclined portion 95 is an example of an eighth portion.

Each of the parallel portions 91, 92, and 93 is a portion of the tail portion 56B extending approximately parallel to the first end surface 61, the second end surface 62, the first guide surface 67, and the second guide surface 68. It is to be noted that the parallel portions 91, 92, and 93 may be inclined with respect to the first end surface 61, the second end surface 62, the first guide surface 67, and the second guide surface 68.

Each of the inclined portions 94 and 95 is a portion of the tail portion 56B extending obliquely with respect to the first end surface 61, the second end surface 62, the first guide surface 67, and the second guide surface 68. In the example of FIG. 4, the parallel portions 91, 92, and 93 and the inclined portions 94 and 95 extend linearly. However, the parallel portions 91, 92, and 93 and the inclined portions 94 and 95 may extend with curves.

The parallel portion 91 is connected to the gimbal portion 55. A portion of the parallel portion 91 is disposed in the second notch C2. The parallel portion 91 is positioned between the second end surface 62 and the holding protrusion 71 in the axial direction. The side surface 63 and the second guide surface 68 of the holding protrusion 71 face the parallel portion 91. The parallel portion 91 extends along the second guide surface 68 of the holding protrusion 71.

The parallel portion 92 is disposed in the first notch C1. The parallel portion 92 is positioned between the first end surface 61 and the holding protrusion 73 of the protrusion 64 in the axial direction. The side surface 63 and the first guide surface 67 of the holding protrusion 73 face the parallel portion 92. The parallel portion 92 extends along the first guide surface 67 of the holding protrusion 73.

The parallel portion 93 is disposed in the second notch C2. The parallel portion 93 is positioned between the second end surface 62 and the holding protrusion 72 of the protrusion 64 in the axial direction. The side surface 63 and the second guide surface 68 of the holding protrusion 72 face the parallel portion 93. The parallel portion 93 extends along the second guide surface 68 of the holding protrusion 72.

The inclined portion 94 extends between one end of the parallel portion 91 and one end of the parallel portion 92 through the first slit S1. The inclined portion 95 extends between the other end of the parallel portion 92 and one end of the parallel portion 93 through the second slit S2. As described above, the tail portion 56B is bent or curved with respect to the parallel portions 91 and 93 extending along the second end surface 62 such that the parallel portion 92 and the inclined portions 94 and 95 are hooked on the holding protrusion 73.

In the first notch C1, the parallel portion 83 of the tail portion 56A and the parallel portion 92 of the tail portion 56B overlap with each other. The parallel portion 92 of the tail portion 56B is positioned between the holding protrusion 73 and the parallel portion 83 of the tail portion 56A.

In the second notch C2, the parallel portion 82 of the tail portion 56A and the parallel portion 91 of the tail portion 56B overlap with each other. The parallel portion 82 of the tail portion 56A is positioned between the holding protrusion 71 and the parallel portion 91 of the tail portion 56B.

The tail portion 56A is bent or curved in advance to have parallel portions 81, 82, and 83 and inclined portions 84 and 85, and is attached to the arm 42. Likewise, the tail portion 56B is bent or curved in advance to have the parallel portions 91, 92, and 93 and the inclined portions 94 and 95, and is attached to the arm 42. Therefore, the tail portions 56A and 56B can be easily attached to the arm 42. It is to be noted that one of the tail portions 56A and 56B may extend linearly without being bent.

For example, a force in the +Z direction may act on the tail portion 56A due to the HSA 15 vibrating or the bent tail portion 56A attempting to restore itself. In this case, the second guide surface 68 of the holding protrusion 71 supports the parallel portion 82 to restrict the movement of the tail portion 56A in the +Z direction. Accordingly, the holding protrusion 71 restricts the parallel portions 81 and 83 from being spaced apart from the protrusion 64 further than the first end surface 61.

Meanwhile, a force in the −Z direction may act on the tail portion 56A, in some cases. In this case, the first guide surfaces 67 of the holding protrusions 72 and 73 support the parallel portion 83 to restrict the tail portion 56A from moving in the −Z direction. Accordingly, the holding protrusions 72 and 73 restrict the parallel portion 82 from being spaced apart from the protrusion 64 further than the second end surface 62.

As described above, the holding protrusions 71, 72, and 73 on which the tail portion 56A is hooked, restrict the movement of the tail portion 56A in the axial direction. Accordingly, the holding protrusions 71, 72, and 73 hold the tail portion 56A in the range between the first end surface 61 and the second end surface 62 in the axial direction.

Like the tail portion 56A, a force in the +Z direction may act on the tail portion 56B, in some cases. In this case, the second guide surfaces 68 of the holding protrusions 71 and 72 support the parallel portions 91 and 93 to restrict the movement of the tail portion 56B in the +Z direction. Accordingly, the holding protrusions 71 and 72 restrict the parallel portion 92 from being spaced apart from the protrusion 64 further than the first end surface 61.

Meanwhile, a force in the −Z direction may act on the tail portion 56B, in some cases. In this case, the first guide surface 67 of the holding protrusion 73 supports the parallel portion 92 to restrict the movement of the tail portion 56B in the −Z direction. Accordingly, the holding protrusion 73 restricts the parallel portions 91 and 93 from being spaced apart from the protrusion 64 further than the second end surface 62.

As described above, the holding protrusions 71, 72, and 73 on which the tail portion 56B is hooked, restrict the movement of the tail portion 56B in the axial direction. Accordingly, the holding protrusions 71, 72, and 73 hold the tail portion 56B in the range between the first end surface 61 and the second end surface 62 in the axial direction.

In the present embodiment, the distance between the first slit S1 and the base plate 51 is shorter than the distance between the first slit S1 and the actuator block 41. In addition, the distance between the second slit S2 and the base plate 51 is shorter than the distance between the second slit S2 and the actuator block 41.

The ends of the tail portions 56A and 56B are attached to the FPC 18. The tail portions 56A and 56B are hooked on the holding protrusions 71, 72, and 73 at a distance from the FPC 18. Therefore, the holding protrusions 71, 72, and 73 can effectively hold the tail portions 56A and 56B in the range between the first end surface 61 and the second end surface 62 in the axial direction.

As illustrated in FIG. 5, one of the plurality of arm dampers 39 is attached to the first end surface 61. Furthermore, another one of the plurality of arm dampers 39 is attached to the second end surface 62. It is to be noted that the arm damper 39 may be attached to only one of the first end surface 61 and the second end surface 62.

The arm damper 39 attached to the first end surface 61 protrudes beyond the side surface 63. The arm damper 39 axially covers a portion of the parallel portion 83 of the tail portion 56A. Accordingly, the arm damper 39 restricts the parallel portion 83 from being spaced apart from the protrusion 64 further than the first end surface 61.

The arm damper 39 attached to the second end surface 62 protrudes beyond the side surface 63. The arm damper 39 axially covers a portion of the parallel portion 93 of the tail portion 56B. Accordingly, the arm damper 39 restricts the parallel portion 93 from being spaced apart from the protrusion 64 further than the second end surface 62.

In the HDD 10 according to the first embodiment described above, the arm 42 includes the first end surface 61, the second end surface 62 opposite to the first end surface 61, the side surface 63 extending between the first end surface 61 and the second end surface 62, and the protrusion 64 spaced apart from the first end surface 61 and the second end surface 62 to protrude from the side surface 63 in the axial direction. The flexure 53A includes the tail portion 56A extending along the side surface 63. The tail portion 56A includes the parallel portion 83 positioned between the first end surface 61 and the protrusion 64 in the axial direction. The tail portion 56A is positioned between the first end surface 61 and the second end surface 62 in the axial direction. That is, the arm 42 is provided with two notches including the first notch C1 and the second notch C2 formed by the protrusion 64 and the side surface 63 and recessed from the first end surface 61 and the second end surface 62, respectively. The tail portion 56A is accommodated in the first notch C1 and the second notch C2 of the arm 42.

In the related art, the strip of the flexure is generally accommodated in a groove provided on the side surface of the arm. In order to form the groove in the arm, the arm is provided with two portions spaced apart from each other in the axial direction while defining the groove formed therebetween. The thickness of the two portions and the groove in the axial direction is made to reach at least a certain thickness according to the strength required of the two portions and the performance of the tool, for example.

Meanwhile, in the HDD 10 of the present embodiment, one protrusion 64 is provided on the arm 42, and the tail portion 56A is accommodated in the first notch C1 and the second notch C2 provided on both sides of the protrusion 64 in the axial direction as described above. Generally, the arm 42 is manufactured by cutting. The first notch C1 and the second notch C2 with shallow depths Tc1 and Tc2 can be formed more easily than grooves with narrow widths. Therefore, even if the protrusion 64 has a certain thickness Tp in the axial direction, the arm 42 can be formed thin in the axial direction by forming the first notch C1 and the second notch C2 shallow. The HDD 10 of the present embodiment can have a larger number of magnetic disks 12 by forming the arm 42 thin, thereby increasing the storage capacity.

For example, SFF-8300, which is a 3.5-inch hard disk drive form factor formulated by the Small Form Factor Committee, sets a plurality of maximum dimensions (hereinafter referred to as specified dimensions) for HDD dimensions in the Z direction. One specified dimension defined in SFF-8300 is 26.10 mm. In the HDD 10 of the present embodiment, by setting the thickness Ta of the arm 42 to approximately 0.470 mm, the thickness Td of the magnetic disk 12 to approximately 0.500 mm, and the distance between the magnetic disk 12 and the arm 42 in the axial direction to approximately 0.331 mm, eleven or more magnetic disks 12 can be located in the range of the specified dimension.

The protrusion 64 includes the plurality of holding protrusions 71, 72, and 73 each protruding from the side surface 63 and located with a gap therebetween. The tail portion 56A further includes the parallel portion 82 and the inclined portion 85. The parallel portion 82 is positioned between the second end surface 62 and the protrusion 64 in the axial direction. The inclined portion 85 extends between the parallel portions 83 and 82 through the gaps (first slits S1) between the plurality of holding protrusions 71, 72, and 73. As a result, the tail portion 56A is attached to the protrusion 64 so as to be restricted from being spaced apart from the protrusion 64 further than the first end surface 61 and from being spaced apart from the protrusion 64 further than the second end surface 62 in the axial direction. Therefore, the HDD 10 of the present embodiment can prevent the tail portion 56A from interfering with the magnetic disk 12. Further, in the HDD 10 of the present embodiment, the tail portion 56A can be attached to the protrusion 64 without using an adhesive or other parts, and the flexures 53A and 53B can be easily detached from the arm 42 during repair, for example.

The parallel portion 83 is positioned between the holding protrusions 72 and 73 and the first end surface 61 in the axial direction. The parallel portion 82 is positioned between the holding protrusion 71 and the second end surface 62 in the axial direction. The inclined portion 85 extends between the parallel portions 83 and 82 through the first slit S1 between the holding protrusions 71 and 73. The tail portion 56B includes the parallel portions 91, 92, and 93 and the inclined portions 94 and 95. The parallel portion 91 is positioned between the second end surface 62 and the holding protrusion 71 in the axial direction. The parallel portion 92 is positioned between the first end surface 61 and the holding protrusion 73 in the axial direction. The inclined portion 94 extends between the parallel portions 91 and 92 through the first slit S1. The parallel portion 93 is positioned between the second end surface 62 and the holding protrusion 72 in the axial direction. The inclined portion 95 extends between the parallel portions 92 and 93 through the second slit S2 between the holding protrusions 72 and 73. That is, the tail portions 56A and 56B are alternately bent or curved to pass through the gaps between the plurality of holding protrusions 71, 72, and 73 and attached to the protrusion 64. As a result, each of the tail portions 56A and 56B is attached to the protrusion 64 so as to be restricted from being spaced apart from the protrusion 64 further than the first end surface 61 and from being spaced apart from the protrusion 64 further than the second end surface 62 in the axial direction. Therefore, the HDD 10 of the present embodiment can prevent the tail portions 56A and 56B from interfering with the magnetic disk. Further, in the HDD 10 of the present embodiment, the tail portions 56A and 56B can be attached to the protrusions 64 without using an adhesive or other parts, and the flexures 53A and 53B can be easily detached from the arms 42 during repair, for example.

The arm damper 39 is attached to the arm 42. The arm damper 39 restricts the parallel portion 83 from being spaced apart from the protrusion 64 further than the first end surface 61 by covering at least a portion of the parallel portion 83 in the axial direction. As a result, the HDD 10 of the present embodiment can prevent the tail portion 56A from interfering with the magnetic disk 12 without complicating the shape of the arm 42.

The distance (depth Tc1) between the protrusion 64 and the first end surface 61 is shorter than the thickness Tp of the protrusion 64 in the axial direction. Furthermore, the distance (depth Tc2) between the protrusion 64 and the second end surface 62 is shorter than the thickness Tp of the protrusion 64 in the axial direction. That is, the first notch C1 and the second notch C2 of the arm 42 are shallowly formed. Therefore, the arm 42 can be formed thinly in the axial direction.

The center of the protrusion 64 is located at the center between the first end surface 61 and the second end surface 62 in the axial direction. That is, the depths of the first notch C1 and the second notch C2 provided on both sides of the protrusion 64 are substantially the same as each other. As a result, the HDD 10 of the present embodiment can prevent the tail portion 56A from protruding from the first notch C1 and the second notch C2 and interfering with the magnetic disk 12. Further, the HDD 10 can set the bending or curving angles of the tail portions 56A and 56B to be substantially the same as each other.

The distance (thickness Ta) between the first end surface 61 and the second end surface 62 in the axial direction is thinner than the thickness Td of each of the plurality of magnetic disks. That is, the arm 42 is formed relatively thin. As a result, the weight of the arm 42 can be reduced, and speeds of the rotation of the carriage 37 and the movement of the magnetic head 14 can be increased.

Second Embodiment

Hereinafter, a second embodiment will be described with reference to FIGS. 6 and 7. In the following description of the embodiments, components having functions similar to those described above may be assigned the same reference numerals as the components described above, and further description thereof may be omitted. In addition, a plurality of components assigned the same reference numerals may not all have common functions and properties, and may have different functions and properties depending on each embodiment.

Figure 6:
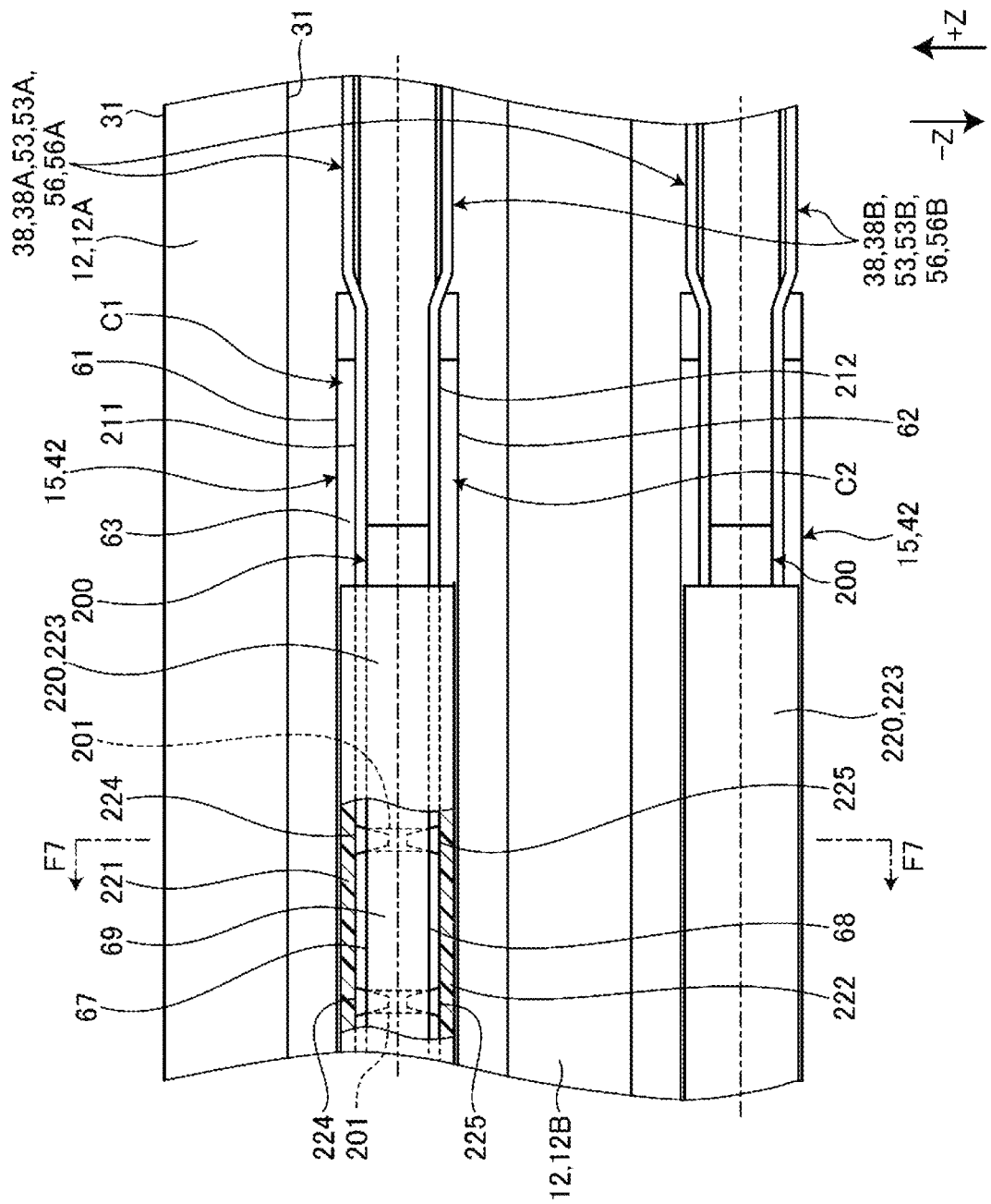
FIG. 6 is a side view illustrating some of a plurality of magnetic disks and some of a plurality of HSAs according to a second embodiment.

FIG. 6 is a side view illustrating some of the plurality of magnetic disks 12A and 12B and some of the plurality of HSAs 15 according to the second embodiment. FIG. 7 is a cross-sectional view illustrating some of the plurality of magnetic disks 12A and 12B and some of the plurality of HSAs 15 of the second embodiment taken along line F7-F7 of FIG. 6.

Figure 7:
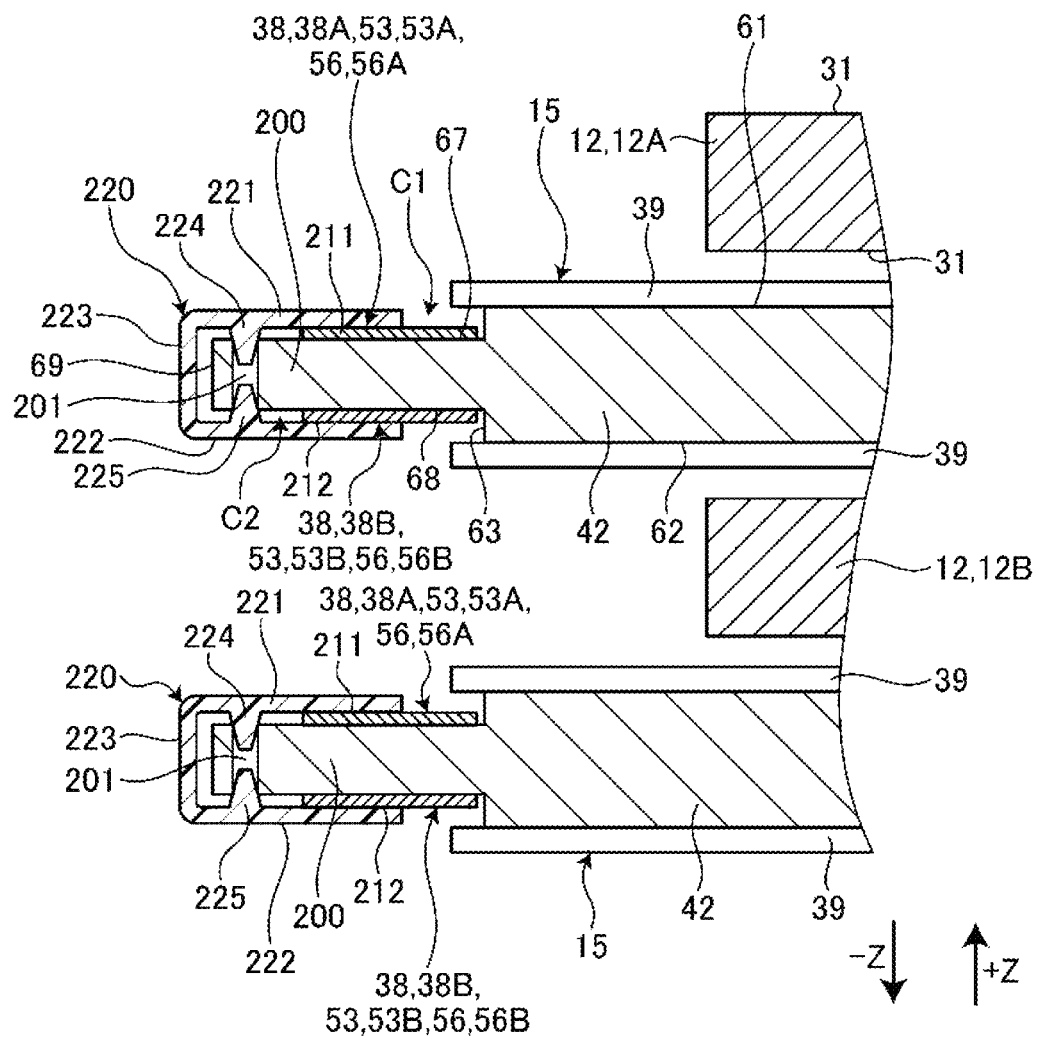
FIG. 7 is a cross-sectional view illustrating some of the plurality of magnetic disks and some of the plurality of HSAs of the second embodiment taken along line F7-F7 of FIG. 6.

As illustrated in FIG. 7, the arm 42 of the second embodiment includes a protrusion 200 instead of the protrusion 64. The protrusion 200 is substantially identical to the protrusion 64 of the first embodiment, except as described below.

The protrusion 200 of the second embodiment is not divided by the first slit S1 and the second slit S2. It is to be noted that the protrusion 200 may be divided by the first slit S1 and the second slit S2 as in the first embodiment.

A plurality of holes 201 are provided in the protrusion 200. The plurality of holes 201 at positions away from each other penetrate the protrusion 200 substantially in the axial direction. Therefore, each of the plurality of holes 201 is open at the first guide surface 67 and the second guide surface 68. Each of the plurality of holes 201 has a circular cross section, for example.

The tail portion 56A of the second embodiment includes a parallel portion 211 instead of the parallel portions 81, 82, and 83 and the inclined portions 84 and 85. The parallel portion 211 is an example of the first portion. The tail portion 56B of the second embodiment includes a parallel portion 212 instead of the parallel portions 91, 92, and 93 and the inclined portions 94 and 95.

The parallel portions 211 and 212 extend approximately parallel to the first end surface 61, the second end surface 62, the first guide surface 67 and the second guide surface 68.

It is to be noted that the parallel portions 211 and 212 may be inclined with respect to the first end surface 61, the second end surface 62, the first guide surface 67 and the second guide surface 68.

The parallel portion 211 is disposed in the first notch C1. The parallel portion 211 is positioned between the first end surface 61 and the first guide surface 67 of the protrusion 200 in the axial direction. The side surface 63 and the first guide surface 67 of the protrusion 200 face the parallel portion 211. The parallel portion 211 extends along the first guide surface 67 of the protrusion 200.

The parallel portion 212 is disposed in the second notch C2. The parallel portion 212 is positioned between the second end surface 62 and the second guide surface 68 of the protrusion 200 in the axial direction. The side surface 63 and the second guide surface 68 of the protrusion 200 face the parallel portion 212. The parallel portion 212 extends along the second guide surface 68 of the protrusion 200.

The HSA 15 of the second embodiment further includes a plurality of holders 220. The holders 220 are made of synthetic resin, for example. It is to be noted that the material of the holders 220 is not limited to this example. Each of the plurality of holders 220 is detachably attached to the protrusion 200 of the corresponding arm 42.

Each of the plurality of holders 220 includes a first limiting wall 221, a second limiting wall 222, a side wall 223, a plurality of first mounting protrusions 224 and a plurality of second mounting protrusions 225. The first limiting wall 221 is an example of the limiting wall. The first mounting protrusion 224 is an example of the mounting protrusion. It is to be noted that the holder 220 is not limited to this example.

The first limiting wall 221 and the second limiting wall 222 extend approximately parallel to the first end surface 61, the second end surface 62, the first guide surface 67 and the second guide surface 68. It is to be noted that the first limiting wall 221 and the second limiting wall 222 may be inclined with respect to the first end surface 61, the second end surface 62, the first guide surface 67 and the second guide surface 68.

The first limiting wall 221 and the second limiting wall 222 are spaced apart from each other in the axial direction. The second limiting wall 222 is spaced apart from the first limiting wall 221 in the −Z direction. The protrusion 200, the parallel portion 211 of the tail portion 56A, and the parallel portion 212 of the tail portion 56B are positioned between the first limiting wall 221 and the second limiting wall 222.

The holder 220, which includes the first limiting wall 221 and the second limiting wall 222, is positioned between the first end surface 61 and the second end surface 62 in the axial direction. The side surfaces 63 face the first limiting wall 221 and the second limiting wall 222. In the present embodiment, the first limiting wall 221 and the second limiting wall 222 are spaced apart from the side surface 63. It is to be noted that the first limiting wall 221 and the second limiting wall 222 are not limited to this example.

The parallel portion 211 is positioned between the first limiting wall 221 and the protrusion 200. Therefore, the first limiting wall 221 covers at least a portion of the parallel portion 211 in the axial direction and restricts the parallel portion 211 from being spaced apart from the protrusion 200 further than the first end surface 61.

The parallel portion 212 is positioned between the second limiting wall 222 and the protrusion 200. Therefore, the second limiting wall 222 covers at least a portion of the parallel portion 212 in the axial direction and restricts the parallel portion 212 from being spaced apart from the protrusion 200 further than the second end surface 62.

The side wall 223 extends between the edge of the first limiting wall 221 and the edge of the second limiting wall 222. The side wall 223 is spaced apart from the protrusion 200. It is to be noted that the side wall 223 may contact the protrusion 200.

The plurality of first mounting protrusions 224 protrude from the first limiting wall 221 in the approximately-Z direction. The plurality of first mounting protrusions 224 are formed in a substantially conical shape that tapers in the −Z direction, for example. Each of the plurality of first mounting protrusions 224 is fitted into a corresponding one of the plurality of holes 201. The first mounting protrusion 224 restricts the holder 220 from moving relative to the protrusion 200 by abutting the edge of the hole 201.

The plurality of second mounting protrusions 225 protrude from the second limiting wall 222 substantially in the +Z direction. The plurality of second mounting protrusions 225 are formed in a substantially conical shape that tapers in the +Z direction, for example. Each of the plurality of second mounting protrusions 225 is fitted into a corresponding one of the plurality of holes 201. The second mounting protrusion 225 restricts the holder 220 from moving relative to the protrusion 200 by abutting the edge of the hole 201.

The holder 220 made of synthetic resin pushes the first mounting protrusion 224 into the hole 201 and pushes the second mounting protrusion 225 into the hole 201 by a force of restoring from elastic deformation, for example. As a result, the first mounting protrusion 224 pushes the edge of the hole 201 and the second mounting protrusion 225 pushes the edge of the hole 201. Therefore, the holder 220 can be prevented from moving with respect to the protrusion 200. In addition, the holder 220 can be detached from the protrusion 200 with elastic deformation.

In the HDD 10 of the second embodiment described above, the holder 220 is attached to the arm 42 and includes the first limiting wall 221. The first limiting wall 221 restricts the parallel portion 211 from being spaced apart from the protrusion 200 further than the first end surface 61 by covering at least a portion of the parallel portion 211 in the axial direction. As a result, the HDD 10 of the present embodiment can prevent the tail portion 56A from interfering with the magnetic disk 12 without complicating the shape of the arm 42.

The holder 220 is made of synthetic resin and detachably attached to the protrusion 200. Accordingly, in the HDD 10 of the present embodiment, the tail portion 56A can be attached to the protrusion 200 without using an adhesive or other parts, and the flexure 53A can be easily detached from the arm 42 during repair, for example.

The plurality of holes 201 are provided in the protrusion 200. The holder 220 includes the plurality of first mounting protrusions 224 fitted into the plurality of holes 201. The plurality of first mounting protrusions 224 restrict the holder 220 from moving relative to the protrusions 200 by abutting edges of the plurality of holes 201. As a result, the holder 220 can be attached to the protrusion 200 without using adhesives or other parts. Furthermore, the holder 220 can be prevented from rotating, and thus can be prevented from coming into contact with the side surface 63 and generating dust.

The HDD 10 of the second embodiment may not have the holder 220. In this case, for example, the parallel portion 211 is adhered to the first guide surface 67 and the parallel portion 212 is adhered to the second guide surface 68. As a result, the HDD 10 can prevent the tail portions 56A and 56B from interfering with the magnetic disk 12 without complicating the shape of the arm 42.

In the description provided above, the term "restriction" is defined as preventing an event, action or influence from occurring or as reducing the degree of the event, action or influence, for example. Further, in the above description, the term "restriction" is defined as preventing movement or rotation, or allowing movement or rotation in a predetermined range and preventing movement or rotation beyond the predetermined range, for example.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
    a plurality of magnetic disks each including a recording surface;
    a first magnetic head capable of reading information from and writing information to one of the plurality of magnetic disks;
    a first suspension including a first flexible substrate on which the first magnetic head is mounted; and
    a carriage including an arm to which the first suspension is attached, the carriage being rotatable around a rotation axis that is oriented in an axial direction, to move the first magnetic head relative to the plurality of magnetic disks, wherein
    the arm includes a first end surface that faces the one of the plurality of magnetic disks when the first magnetic head is moved over the recording surface thereof, a second end surface opposite to the first end surface, a side surface extending between the first end surface and the second end surface, and a protruding body that protrudes from the side surface, the protruding body having a first surface parallel to and spaced apart from the first end surface and having a second surface parallel to and spaced apart from the second end surface,
    the first flexible substrate includes a first strip extending along the side surface of the arm, and the first strip includes a first portion positioned between the first end surface of the arm and the protruding body of the arm in the axial direction and positioned between the first and second end surfaces of the arm in the axial direction,
    the protruding body of the arm includes a plurality of holding protrusions each protruding from the side surface of the arm, the plurality of holding protrusions overlapping each other as viewed in a radial direction perpendicular to the axial direction, and the arm including a gap between adjacent ones of the plurality of holding protrusions, and
    the first strip of the first flexible substrate further includes a second portion positioned between the second end surface of the arm and the protruding body of the arm in the axial direction and a third portion extending between the first portion and the second portion through the gap between the adjacent ones of the plurality of holding protrusions, the adjacent ones of the plurality of holding protrusions being located adjacent to each other in the radial direction.

2. The disk device according to claim 1, wherein a center of each of the plurality of holding protrusions is located at a center between the first end surface of the arm and the second end surface of the arm.

3. The disk device according to claim 1, further comprising:
    a second magnetic head configured to read information from and write information to another one of the plurality of magnetic disks; and
    a second suspension including a second flexible substrate on which the second magnetic head is mounted, the second suspension being attached to the arm, wherein
    the second flexible substrate includes a second strip extending along the side surface of the arm,
    the plurality of holding protrusions includes a first holding protrusion, a second holding protrusion, and a third holding protrusion positioned between the first holding protrusion and the second holding protrusion,
    the first portion of the first strip is positioned between the second and third holding protrusions and the first end surface of the arm in the axial direction,
    the second portion of the first strip is positioned between the first holding protrusion and the second end surface of the arm in the axial direction,
    the third portion of the first strip extends between the first and second portions of the first strip through a first gap between the first holding protrusion and the third holding protrusion, and
    the second strip includes a fourth portion positioned between the second end surface of the arm and the first holding protrusion in the axial direction, a fifth portion positioned between the first end surface of the arm and the third holding protrusion in the axial direction, a sixth portion extending between the fourth portion and the fifth portion through the first gap, a seventh portion positioned between the second end surface of the arm and the second holding protrusion in the axial direction, and an eighth portion extending between the fifth portion and the seventh portion through a second gap between the second holding protrusion and the third holding protrusion.

4. The disk device according to claim 1, wherein
    a distance between the protruding body of the arm and the first end surface of the arm in the axial direction is less than a thickness of the protruding body of the arm in the axial direction, and
    a distance between the protruding body of the arm and the second end surface of the arm in the axial direction is less than the thickness of the protruding body of the arm in the axial direction.

5. The disk device according to claim 1, wherein a center of the protruding body of the arm is located at a center between the first and second end surfaces of the arm in the axial direction.

6. The disk device according to claim 1, wherein a distance between the first and second end surfaces of the arm in the axial direction is less than a thickness of any of the plurality of magnetic disks.

7. The disk device according to claim 1, wherein the arm is positioned between two adjacent ones of the plurality of magnetic disks in the axial direction.

8. The disk device according to claim 1, wherein the number of magnetic disks is 11 or more.

9. The disk device according to claim 1, wherein a distance between the first and second end surfaces of the arm in the axial direction is 0.4 mm to 0.65 mm.

10. The disk device according to claim 1, wherein a distance between any two adjacent ones of the plurality of magnetic disks in the axial direction is 1.1 mm to 1.2 mm.

11. The disk device according to claim 1, wherein the plurality of holding protrusions have first guide surfaces extending on the first surface of the protruding body and that are provided on the same plane, and second guide surfaces extending on the second surface of the protruding body and that are provided on the same plane.

12. A disk device comprising:
a magnetic disk including a recording surface;
a magnetic head capable of reading information from and writing information to the magnetic disk;
a suspension including a flexible substrate on which the magnetic head is mounted; and
a carriage including an arm to which the suspension is attached, the carriage being rotatable around a rotation axis that is oriented in an axial direction, to move the magnetic head relative to the magnetic disk, wherein
the arm includes a first end surface that faces the magnetic disk when the magnetic head is moved over the recording surface, and includes a second end surface opposite to the first end surface,
a distance between the first and second end surfaces of the arm in the axial direction is less than a thickness of the magnetic disk,
the arm further includes a side surface extending between the first and second end surfaces of the arm, and further includes a protruding body that protrudes from the side surface, the protruding body having a first surface parallel to and spaced apart from the first end surface of the arm and having a second surface parallel to and spaced apart from the second end surface of the arm,
the flexible substrate includes a strip extending along the side surface of the arm, and the strip includes a first portion positioned between the first end surface of the arm and the protruding body of the arm in the axial direction and positioned between the first and second end surfaces of the arm in the axial direction,
the protruding body of the arm includes a plurality of holding protrusions each protruding from the side surface of the arm, the arm including a gap between adjacent ones of the plurality of holding protrusions,
the strip of the flexible substrate further includes a second portion positioned between the second end surface of the arm and the protruding body of the arm in the axial direction and a third portion extending between the first portion and the second portion through the gap between the adjacent ones of the plurality of holding protrusions,
the plurality of holding protrusions includes a first holding protrusion, a second holding protrusion, and a third holding protrusion positioned between the first holding protrusion and the second holding protrusion,
the first portion of the strip is positioned between the second and third holding protrusions and the first end surface of the arm in the axial direction,
the second portion of the strip is positioned between the first holding protrusion and the second end surface of the arm in the axial direction, and
the third portion of the strip extends between the first and second portions of the strip through a gap between the first holding protrusion and the third holding protrusion.

13. The disk device according to claim 12, wherein
a distance between the protruding body of the arm and the first end surface of the arm in the axial direction is less than a thickness of the protruding body of the arm in the axial direction, and
a distance between the protruding body of the arm and the second end surface of the arm in the axial direction is less than the thickness of the protruding body of the arm in the axial direction.

14. The disk device according to claim 12, wherein the distance between the first and second end surfaces of the arm in the axial direction is 0.4 mm to 0.65 mm.

15. The disk device according to claim 12, wherein the thickness of the magnetic disk is 0.5 mm or more.

16. The disk device according to claim 12, wherein the thickness of the magnetic disk is approximately 0.635 mm.

* * * * *